United States Patent [19]

Morita et al.

[11] Patent Number: 5,498,656
[45] Date of Patent: Mar. 12, 1996

[54] POLYVINYL ALCOHOL MOLDING RESIN COMPOSITION

[75] Inventors: Yusuke Morita; Masami Fukushima, both of Saitama; Fumio Gotou; Shigeo Aoki, both of Tokyo, all of Japan

[73] Assignees: Shin-Etsu Polymer Co., Ltd.; Akishima Chemical Industries Co., Ltd., both of Tokyo, Japan

[21] Appl. No.: 414,296

[22] Filed: Mar. 31, 1995

[30] Foreign Application Priority Data

Mar. 31, 1994 [JP] Japan ..................... 6-063224

[51] Int. Cl.$^6$ .................. C08K 5/52; C08K 5/42
[52] U.S. Cl. ............. 524/140; 524/141; 524/157; 524/158
[58] Field of Search .................. 524/140, 141, 524/157, 158, 161, 459, 312

[56] References Cited

U.S. PATENT DOCUMENTS 4,983,668  1/1991  Cutter ......................... 525/23

FOREIGN PATENT DOCUMENTS 52-021090  2/1977  Japan.

Primary Examiner—Paul R. Michl
Assistant Examiner—La Vonda R. Dewitt
Attorney, Agent, or Firm—Wenderoth, Lind & Ponack

[57] ABSTRACT

Proposed is a polyvinyl alcohol molding resin composition exhibiting excellent workability in the molding procedure by extrusion and injection and capable of giving molded articles, e.g., films and sheets, having excellent properties in respect of good appearance and excellent resistance against coloration by heating. The molding resin composition comprises a polyvinyl alcohol and a limited amount of an additive ingredient which is an alkali or alkaline earth metal salt of organic sulfonic acid, e.g., sodium and calcium dodecylbenzene sulfonates, a polyoxyethylene ester of phosphoric acid or a combination thereof.

6 Claims, No Drawings ns are usually melt-molded into films and sheets
POLYVINYL ALCOHOL MOLDING RESIN COMPOSITION

BACKGROUND OF THE INVENTION

The present invention relates to a novel molding resin composition based on a polyvinyl alcohol, referred to as PVA hereinafter, for shaping of a film or sheet or, more particularly, to a polyvinyl alcohol-based molding resin composition compounded with a specific additive ingredient and suitable for melt-molding in a substantially anhydrous condition.

Polyvinyl alcohol as a full or partial saponification product of a poly(vinyl ester) is a useful resinous material for shaping of films and sheets by melt-molding. Different from other thermoplastic resins, however, polyvinyl alcohol resins are subject to thermal decomposition at a temperature lower than the melting point thereof so that polyvinyl alcohol resins are usually melt-molded into films and sheets by the method of extrusion molding or casting with water as the plasticizer. Such a molding method for a hydrous resin requires addition of a large volume of water to the resin so that it is essential that the molding machine is operated under exact temperature control or, in particular, the temperature of the extrusion die is kept not to exceed 100° C. in order to prevent bubble formation in the extruded material while the film or sheet as extruded must be continuously dried and subjected to a heat treatment. Therefore, the molding process is necessarily troublesome and the costs for the preparation of films or sheets are very high.

Various proposals and attempts have been made heretofore to solve the above mentioned problems in the molding method of PVAs. For example, Japanese Patent Publication 37-12538 proposes to convert a PVA to a sulfate of PVA by the addition of sulfamic acid in order to improve the compatibility of PVA with water. Japanese Patent Publication 42-18813 discloses a method in which a PVA is compounded with a plasticizer which is an ester of phosphoric acid with an alcohol, glycol ether and amide compound. Various additives are proposed in order to prevent coloration of a PVA by heat in the course of thermal forming of the PVA including sodium sulfonate Salts of dibasic fatty acid ester (Japanese Patent Publication 43-3975), mercaptothiazole or imidazole compounds (Japanese Patent Publication 45-7691), carboxylic acids (Japanese Patent Publication 46-37664) and alkali metal salts of phosphoric acid (Japanese Patent Publication 47-24265). Japanese Patent Kokai 49-131240 teaches admixture of a propionic acid adduct of glycerin with a PVA of low saponification degree of 35 to 60% by moles. Japanese Patent Kokai 49-120946 teaches admixture of a glycerin adduct of phthalic acid with a PVA of low saponification degree of 70 to 97% by moles. Japanese Patent Kokai 51-88544 teaches that coloration of a PVA can be prevented by the admixture of phosphoric acid or pyrophosphoric acid.

No sufficient improvements, however, can be obtained in each of these prior art methods for preventing coloration of PVAs in a dynamic thermal forming process accompanied by heat evolution in PVAs such as extrusion molding and calendering.

Another important factor influencing the workability of a PVA in thermal forming is the releasability of the resin from metal molds and other metallic surfaces of molding machines. In this regard, a method is proposed in Japanese Patent Kokai 4-202535, 5-98038 and 5-96617 according to which the workability in melt-molding of a PVA can be improved by compounding the PVA with a salt of an alkali metal or alkaline earth metal. Japanese Patent Kokai 5-163369 teaches that an improvement can be accomplished in the mold-releasability and plate-out behavior of a PVA resin in the process of thermal forming by using an alkyl polyoxyethyleneadduct of dimethyl ammonium chloride as a surface active agent. Further, Japanese Patent Kokai 5-194812 proposes to improve the die-releasability of a PVA resin in extrusion molding by the use of an aqueous silicone emulsion. Though not ineffective for the improvement of the workability in thermal forming of a PVA resin, however, these methods provide no or little improvement for the thermal stability of the resin to cause coloration so that the methods have low practical applicability.

Besides, Japanese Patent Publication 44-28588 proposes a method for the melt-molding of a PVA resin in an anhydrous condition by the admixture of a polyhydric alcohol. This method, however, can hardly be practiced as an industrial method due to the difficulty in accomplishing long-run continuous operation of the molding process as a consequence of accumulation of resinous residue called scorch on the surfaces of the screws, extrusion dies and the like of the molding machine to greatly affect the smoothness of the surface or appearance of the products. In addition, proposals have been made in Japanese Patent Publication 42-26930 for the melt-molding of a modified PVA obtained by the saponification of a polyvinyl acetate in the presence of a polyhydric alcohol, in Japanese Patent Kokai 50-22049 for the melt-molding of a PVA compounded with an ester of a polyhydric alcohol with a condensation product of an aromatic carboxylic acid and a condensed-ring hydrocarbon compound and in Japanese Patent Publications 53-24975 and 56-49733 for the melt-molding of a resin composition consisting of an α-olefin-modified PVA and a thermoplastic resin in an anhydrous condition but no fully anhydrous condition of molding can be accomplished in these methods.

Japanese Patent Kokai 3-203932 further proposes a method of melt-molding of a copolymeric PVA containing polyoxyalkylene groups but this method is not free from difficulties in respect of the high costs for the copolymerization of vinyl alcohol, vinyl ester, oxyalkylene allyl ether and the like, the relatively low yield of the copolymer and recovery and recycling of the solvent used for the copolymerization.

SUMMARY OF THE INVENTION

The present invention accordingly has an object to provide, in view of the above described problems and disadvantages in the PVA-based molding resin compositions of the prior art, a novel and improved PVA resin-based molding composition suitable for the thermal forming process such as melt-extrusion molding, injection molding, calendering, hot-roller forming and the like in a substantially anhydrous condition without the troubles due to thermal degradation of the resin and poor releasability from the metallic surfaces of the molding machine and capable of giving molded articles of the PVA resin having excellent stability against degradation and coloration of the resin under heat and light.

Thus, the polyvinyl alcohol-based molding resin composition of the present invention is a uniform blend which comprises:

(a) 100 parts by weight of a polyvinyl alcohol-based resin; and (b) from 0.01 to 30 parts by weight of an additive ingredient selected from the group consisting of:

(b1) a metal salt of an organic sulfonic acid represented by the general formula $$(R^1SO_3)_xM, \quad (I)$$

in which $R^1$ is an alkyl group, alkoxy group, diaryl ether group or alkaryl group having from 10 to 24 carbon atoms, M is an atom of an alkali metal or an alkaline earth metal and the subscript x is 1, when M is an atom of an alkali metal, or 2, when M is an atom of an alkaline earth metal;

(b2) a polyoxyethylene phosphoric acid ester represented by the general formula $$R^2(CH_2CH_2O)_nPO[O(CH_2CH_2O)_mR^3]_{2-y}(OH)_y, \quad (II)$$

in which $R^2$ and $R^3$ are each, independently from the other, an alkyl or alkaryl group having 4 to 24 carbon atoms, the subscript y is 1 or 2 and the subscripts n and m are each, independently from the other, a positive integer not exceeding 100; and a combination of (b1) and (b2).

In particular, it is preferable that the above defined organic sulfonic acid salt of the general formula (I) is sodium or calcium dodecylbenzene sulfonate and the polyoxyethylene phosphoric acid ester of the general formula (II) is a compound of which the polyoxyethylene group is a tridecyl-terminated polyoxyethylene group and the subscripts n and m are each an integer of 4 to 10 or is a compound of which the polyoxyethylene group is a nonylphenyl-terminated polyoxyethylene group and the subscripts n and m are each an integer of 5 to 55. More preferably, the additive ingredient (b) is a combination of sodium dodecylbenzene sulfonate as the ingredient (b1) and a polyoxyethylene phosphoric acid of the general formula (II) of which the polyoxyethylene group is a tridecyl-terminated polyoxyethylene group and the subscripts n and m are each an integer of 4 to 10.

DETAILED DESCRIPTION OF THE PREFERRED EMBODIMENTS

As is described above, the most characteristic feature of the inventive PVA-based molding resin composition consists in the unique formulation comprising the specific additive ingredient which is a compound defined in (b1) or (b2) above or a combination thereof.

The additive compound (b1) is a metal salt of an organic sulfonic acid represented by the general formula (I) given above. Examples of suitable organic metal sulfonates as the ingredient (b1) and in conformity with the general formula and definition of each of the symbols include: metal salts of alkyl sulfonic acid such as sodium and calcium decyl sulfonates; sodium, potassium, magnesium, calcium and barium dodecyl sulfonates; and sodium, magnesium and calcium tetradecyl sulfonates; metal salts of alkoxy sulfonic acid such as sodium, magnesium and calcium dodecyloxy sulfonates; sodium, magnesium and calcium tridecyloxy sulfonates; and sodium, magnesium and calcium pentadecyloxy sulfonates; metal salts of alkaryl sulfonic acid such as sodium, potassium, magnesium, calcium and barium dodecylbenzene sulfonates; and sodium, magnesium and calcium tetradecylbenzene sulfonates; metal salts of alkyl diaryl ether disulfonic acid such as sodium, potassium, magnesium, calcium and barium dodecyl diphenyl ether disulfonates; and metal salts of alkaryl sulfonic acid such as sodium, magnesium and calcium propylnaphthalene sulfonates. The above mentioned alkyl group is preferably a straight-chain alkyl group derived from a normal paraffin in respect of the high biodegradability as compared with branched alkyl groups derived from a propylene tetrameter. It is optional to use two kinds or more of the above described metal sulfonates in combination.

In the polyoxyethylene phosphoric acid ester as the ingredient (b2) represented by the general formula (II), examples of suitable polyoxyethylene groups include octyl polyoxyethylene groups of which n and m are each 5 to 25, decyl polyoxyethylene groups of which n and m are each 5 to 25, dodecyl polyoxyethylene groups of which n and m are each 4 to 10, tridecyl polyoxyethylene groups of which n and m are each 4 to 10, octylphenyl polyoxyethylene groups of which n and m are each 5 to 55, nonylphenyl polyoxyethylene groups of which n and m are each 5 to 55 and dodecylphenyl polyoxyethylene groups of which n and m are each 5 to 55. It is optional to use two kinds or more of polyoxyethylene phosphoric acid esters having different polyoxyethylene groups mentioned above in combination.

It is further optional to use the above described metal sulfonates and the above described polyoxyethylene phosphoric acid esters in combination. When used in combination, the weight ratio of the metal sulfonate to the polyoxyethylene phosphoric acid ester is in the range from 90:10 to 30:70 or, preferably, from 75:25 to 50:50. Adequate selection of these additive compounds is important depending on the intended application of the molded articles of the PVA-based resin composition. For example, these additive compounds must have absolutely no toxicity against human body when the molded article is a container or wrapping material for foods although low toxicity is permissible when the molded article is never brought into contact with foods. The amount of the additive ingredient (b), which is the compound (b1), compound (b2) or a combination thereof, in the inventive PVA-based molding resin composition is in the range from 0.01 to 30 parts by weight or, preferably, in the range from 0.1 to 8 parts by weight per 100 parts by weight of the PVA-based resin as the component (a).

The principal ingredient as the component (a) in the inventive molding resin composition is a polyvinyl alcohol which is a resin obtained by the saponification reaction of a polymer of vinyl ester such as vinyl acetate, vinyl propionate, vinyl pivalate, vinyl ester of Versatic acid (a tradename) and the like either alone or in combination of two kinds or more according to need. The PVA has an average degree of polymerization in the range from 100 to 3000 because, when the average degree of polymerization of the PVA is too low, the article shaped from the resin composition would have poor mechanical properties while, when the value is too high, a decrease is caused in the workability of the resin composition under molding so that the resin composition must be compounded with a polyhydric alcohol as a plasticizer which is detrimental against the thermal stability of the resin composition. The degree of saponification of the poly(vinyl ester) should be at least 50% by moles or, preferably, at least 80% by moles. When the degree of saponification is too low, the resin is no longer a polyvinyl alcohol but is only a partially saponified poly(vinyl ester) not exhibiting the excellent properties inherent in PVAs.

It is of course that the PVA-based resin as the component (a) in the inventive molding resin composition is not limited to those derived from the polymer of a vinyl ester alone but can be those derived from a copolymer of a vinyl ester with one or more of other ethylenically unsaturated monomeric compounds copolymerizable with the vinyl ester. Examples of suitable comonomers include olefins such as ethylene, propylene, 1-butene and isobutylene, acrylic acid and salts thereof, alkyl acrylates such as methyl and ethyl acrylates, methacrylic acid and salts thereof, alkyl methacrylates such as methyl and ethyl methacrylates, acrylamide and derivatives thereof such as N-methyl acrylamide, methacrylamide and derivatives thereof such as N-methyl methacrylamide, vinyl ethers such as methyl vinyl ether and n-propyl vinyl ether, unsaturated nitrile compounds such as acrylonitrile and methacrylonitrile, halogenated vinyl and vinylidene compounds such as vinyl chloride, vinylidene chloride, vinyl fluoride and vinylidene fluoride, allyl compounds such as allyl acetate and allyl chloride, maleic acid and salts and esters thereof, vinylsilyl compounds such as vinyl trimethoxy silane, isopropenyl acetate and so on. The amount of these comonomers in the monomer mixture with the vinyl ester should not exceed 10% by moles or, preferably, 5% by moles.

It is of course optional that the PVA-based molding resin composition of the invention is compounded with various kinds of known additives each in a limited amount not to substantially decrease the transparency of the molded articles. The optional additives include antioxidants such as organic phosphorous acid esters, hindered phenolic compounds and alkyl esters of sulfur-containing carboxylic acid, heat stability improvers such as β-diketone compounds and epoxy compounds, stabilizers against light such as ultraviolet absorbers, inorganic salts such as sodium chloride, potassium chloride, calcium chloride, zinc chloride and magnesium chloride and stabilization aids such as synthetic hydrotalcite and A-type zeolite.

The phosphorous acid esters as an antioxidant include trialkyl phosphites, triaryl phosphites, alkyl aryl phosphites, bisphenol A phosphites and polyhydric alcohol phosphites exemplified by triphenyl phosphite, triisooctyl phosphite, triisodecyl phosphite, tri-isotridecyl phosphite, tribenzyl phosphite, trinonylphenyl phosphite, diphenyl isooctyl phosphite, diphenyl isodecyl phosphite, diisodecyl pentaerithritol diphosphite, tetraphenyl dipropyleneglycol diphosphite, poly(dipropyleneglycol) phenyl phosphite, distearyl pentaerithritol diphosphite, tri-2,4-di-tert-butyl phenyl phosphite, 2,4-di-tert-butylphenyl diisodecyl phosphite, tributoxyethyl phosphite, 4,4'-isopropylidene diphenyl alkyl($C_2$–$C_5$) diphosphite and heptakis(dipropyleneglycol) triphosphite.

The hindered phenolic compounds as the antioxidant include alkylated phenols, alkylated phenol esters, alkylene or alkylidene bisphenols and polyalkylated phenol esters exemplified by butylated hydroxy toluenes, 4-hydroxymethyl-2,6-di-tert-butyl phenol, 4,4'-dihydroxy-2,2'-diphenyl propane, 2,2'-methylene bis(4-meth- yl-6-tert-butyl phenol) and 4,4'-thiobis(6-tert-butyl-8-methyl phenol).

The β-diketone compound as the heat stabilization aid is exemplified by dehydroacetic acid, cyclohexan-1,3-dione, 2-acetyl cyclopentanone, 2-benzoyl cyclopentanone, 2-acetyl cyclohexanone, 2-benzoyl cyclohexanone, acetyl stearoyl methane, benzoyl acetone, palmitoyl benzoyl methane, stearoyl benzoyl methane, dibenzoyl methane, tribenzoyl methane, 4-methoxybenzoyl benzoyl methane, bis(4-methoxybenzoyl ,methane), 4-chlorobenzoyl benzoyl methane, benzoyl trifluoro acetone, palmitoyl tetralone, stearoyl tetralone and benzoyl tetralone.

The epoxy compounds as the heat-stabilization aid include epoxidated unsaturated oils and fats, epoxidated unsaturated fatty acid esters and epoxy cyclohexane derivatives exemplified by epoxidated soybean oil, epoxidated castor oil, epoxidated linseed oil, epoxidated safflower oil, butyl ester of epoxidated linseed oil fatty acid, alkyl, e.g., butyl, isooctyl and 2-ethylhexyl, esters of epoxidated stearic acid, di-2-ethylhexyl epoxy hydrophthalate and epoxidated polybutadienes.

The ultraviolet absorbers as the stabilizer against light include benzotriazole compounds, such as 2-(5-methyl-2-hydroxy phenyl) benzotriazole and 2-(3,5-di-tert-butyl-2-hydroxy phenyl)-6-chloro benzotriazole, and hindered amine compounds, such as polycondensation products of dimethyl-1-(2-hydroxyethyl)- 4hydroxy-2,2,6,6-tetramethyl piperidine succinate and poly{[6-(1,1,3,3-tetramethyl piperidine)imino-1,3,5-triazin-2,4-diyl][(2,2,6,6-tetramethyl piperidine)imino]hexamethylene[(2,2,6,6-tetramethyl piperidine) imino]}.

The PVA-based molding resin composition of the invention can be admixed, according to need, with a plasticizer for the PVA resin such as polyhydric alcohols and derivatives thereof. Examples of the polyhydric alcohol include ethyleneglycol, diethyleneglycol, triethyleneglycol, polyethyleneglycol, propyleneglycol, glycerin, diglycerin and triglycerin as well as mono- and dipentaerithritols, mannitol, sorbitol and the like.

The derivatives of a polyhydric alcohol as the plasticizer include esters of a polyhydric alcohol with a carboxylic acid, amino acid or rosin exemplified by pentaerithritol stearate, pentaerithritol adipate, dipentaerithritol pyrrolidone carboxylate, dipentaerithritol glutamate, wood rosin pentaerithritol, maleic anhyd- ride-modified wood rosin pentaerithritol and wood rosin glycerol esters.

Other plasticizers for PVA resins include nitrogen-containing compounds exemplified by ester compounds of β-amino crotonic acid and 1,3- or 1,4-butane diol, 1,2-dipropyleneglycol, thiodiethyleneglycol or lauryl alcohol and isocyanurate compounds such as tris(hydroxyethyl) isocyanurate and tris(mercaptoethyl or mercaptopropyl) isocyanurate.

The amount of the polyhydric alcohol or a derivative thereof admixed with the inventive resin composition as a plasticizer naturally depends on various factors or, in particular, on the average degree of polymerization of the PVA resin but, when added, it is usually in the range from 0.01 to 30 parts by weight or, preferably, from 1 to 20 parts by weight per 100 parts by weight of the PVA resin. When the PVA resin has an average degree of polymerization of 100 to 600 and a degree of saponification of 5 to 99% by moles and the content of water therein does not exceed the minimum amount unavoidable in the preparation of the PVA resin, use of such a plasticizer is not always necessary because the water contained in the resin acts as a plasticizer while, when the average degree of polymerization of the PVA resin exceeds 600, the PVA resin cannot be imparted with flowability behavior suitable for molding without the addition of a plasticizer although the amount of the plasticizer added should not be too large because of possible bleeding of the plasticizer on the surface of the molded article of the resin composition.

Besides the above described optional additives, the PVA-based molding resin composition of the invention can be compounded according to need with various kinds of known additives conventional in PVA-based molding compositions in the prior art including other thermoplastic resins such as polyethylene and polypropylene, starch, cellulose derivatives such as carboxymethyl cellulose and hydroxyethyl cellulose, polysaccharides such as xanthan gum, carrageenan, chitin and chitosan, lubricants such as stearic acid, phosphoric acid esters, glycerin fatty acid esters and sorbic acid esters, fillers such as talc and calcium carbonate, coloration inhibitors such as magnesium sulfate, zinc sulfate, cobalt sulfate, tin (II) acetate, lead formate and manganese bromide, coloring agents such as titanium dioxide and carbon black, blowing agents, pH controlling agents and so on.

In the following, the PVA-based molding resin composition of the invention is illustrated in more detail by way of examples and comparative examples. The term of "parts" in the following description always refers to "parts by weight".

EXAMPLE 1

A PVA-based resin composition was prepared from:
- 100 parts of a PVA having an average degree of polymerization of 1700 and a degree of saponification of 98.5% by moles;
- 20 parts of glycerin as a plasticizer; and
- 2.0 parts of calcium dodecyl sulfonate.

Thus, the above mentioned ingredients were manually well blended and the blend was heated for 30 minutes in an air oven kept at 100° C. The blend was then subjected to rolling on a test mixing roller of which the rollers had a diameter of 155 mm and a length of 380 mm with a roller gap of 0.3 mm, the revolution of the front roller and the rear roller was 22 rpm and 20 rpm, respectively, and the temperature of the roller surface was kept at 215° C. During the continued test rolling, a 50 mm by 50 mm wide test specimen was taken after every 2.5 minutes of rolling and the test specimens taken after 10 minutes of rolling were subjected to visual inspection for the evaluation of coloration by thermal degradation of the resin to record the results in five ratings giving point 5 for the best absolutely without coloration and point 1 for the worst with coloration to yellow. Further, the test specimens taken after 5 minutes of rolling were visually inspected for the smoothness of the surface to record the results in five ratings giving point 5 for the best and point 1 for the worst.

Further, the workability in rolling was evaluated by the inspection of the releasability of the sheet from the roller surface and plate-out on the roller surface to record the results of each item in five ratings giving point 5 for the best and point 1 for the worst and by the measurement of the rolling time until incipient sticking of the resin composition under rolling to the roller surface to record the result in minutes. Table 1 below summarizes the results of the evaluation tests for the above mentioned five testing items.

EXAMPLE 2

The experimental procedures including the formulation of the resin composition and the evaluation tests were substantially the same as in Example 1 excepting replacement of calcium dodecyl sulfonate with the same amount of sodium dodecylbenzene sulfonate. The results of the evaluation tests are summarized in Table 1.

EXAMPLE 3

The experimental procedures including the formulation of the resin composition and the evaluation tests were substantially the same as in Example 1 excepting replacement of calcium dodecyl sulfonate with the same amount of calcium dodecyl diphenyl ether disulfonate. The results of the evaluation tests are summarized in Table 1.

EXAMPLE 4

The experimental procedures including the formulation of the resin composition and the evaluation tests were substantially the same as in Example 1 excepting replacement of 2.0 parts of calcium dodecyl sulfonate with 1.5 parts of phosphoric acid ester of tridecyl polyoxyethylene (n,m=4 to 10). The results of the evaluation tests are summarized in Table 1.

EXAMPLE 5

The experimental procedures including the formulation of the resin composition and the evaluation tests were substantially the same as in Example 1 excepting replacement of 2.0 parts of calcium dodecyl sulfonate with 1.5 parts of phosphoric acid ester of nonylphenyl polyoxyethylene (n,m=5 to 55). The results of the evaluation tests are summarized in Table 1.

EXAMPLE 6

The experimental procedures including the formulation of the resin composition and the evaluation tests were substantially the same as in Example 1 excepting additional admixture of 0.5 part of phosphoric acid ester of tridecyl polyoxyethylene (n,m=4 to 10) in the formulation of the resin composition. The results of the evaluation tests are summarized in Table 1.

EXAMPLE 7

The experimental procedures including the formulation of the resin composition and the evaluation tests were substantially the same as in Example 1 excepting replacement of 2.0 parts of calcium dodecyl sulfonate with a combination of 2.0 parts of sodium dodecylbenzene sulfonate and 0.5 part of phosphoric acid ester of tridecyl polyoxyethylene (n,m=4 to 10) in the formulation of the resin composition. The results of the evaluation tests are summarized in Table 1.

Comparative Example 1

The experimental procedures including the formulation of the resin composition and the evaluation tests were substantially the same as in Example 1 excepting omission of calcium dodecyl sulfonate in the formulation of the resin composition. The results of the evaluation tests are summarized in Table 1.

Comparative Example 2

The experimental procedures including the formulation of the resin composition and the evaluation tests were substantially the same as in Example 1 excepting replacement of calcium dodecyl sulfonate with the same amount of dodecylbenzene sulfonic acid. The results of the evaluation tests are summarized in Table 1.

Comparative Example 3

The experimental procedures including the formulation of the resin composition and the evaluation tests were substantially the same as in Example 1 excepting replacement of 2.0 parts of calcium dodecyl sulfonate with 1.5 parts of di-2-ethylhexyl phosphate. The results of the evaluation tests are summarized in Table 1.

Comparative Example 4

The experimental procedures including the formulation of the resin composition and the evaluation tests were substantially the same as in Example 1 excepting replacement of calcium dodecyl sulfonate with the same amount of bisphenol A. The results of the evaluation tests are summarized in Table 1.

Comparative Example 5

The experimental procedures including the formulation of the resin composition and the evaluation tests were substantially the same as in Example 1 excepting replacement of calcium dodecyl sulfonate with the same amount of sodium dioctyl sulfosuccinate. The results of the evaluation tests are summarized in Table 1.

EXAMPLE 8

The experimental procedures including the formulation of the resin composition and the evaluation tests were substantially the .same as in Example 1 excepting replacement of calcium dodecyl sulfonate with the same amount of sodium dodecylbenzene sulfonate and the surface temperature of the mixing rollers was 210° C. instead of 215° C. The results of the evaluation tests are summarized in Table 2.

EXAMPLE 9

The experimental procedures including the formulation of the resin composition and the evaluation tests were substantially the same as in Example 8 excepting replacement of 2.0 parts of sodium dodecylbenzene sulfonate with 1.5 parts of phosphoric acid ester of tridecyl polyoxyethylene (n,m=4 to 10). The results of the evaluation tests are summarized in Table 2.

EXAMPLE 10

The experimental procedures including the formulation of the resin composition and the evaluation tests were substantially the same as in Example 8 excepting replacement of sodium dodecylbenzene sulfonate with the same amount of a 1:1 by weight mixture of sodium dodecyl sulfonate and potassium dodecyl sulfonate. The results of the evaluation tests are summarized in Table 2.

EXAMPLE 11

The experimental procedures including the formulation of the resin composition and the evaluation tests were substantially the same as in Example 8 excepting replacement of sodium dodecylbenzene sulfonate with the same amount of calcium dodecylbenzene sulfonate. The results of the evaluation tests are summarized in Table 2.

EXAMPLE 12

The experimental procedures including the formulation of the resin composition and the evaluation tests were substantially the same as in Example 8 excepting replacement of sodium dodecylbenzene sulfonate with the same amount of a 1:1 by weight mixture of sodium propylnaphthalene sulfonate and calcium propylnaphthalene sulfonate. The results of the evaluation tests are summarized in Table 2.

EXAMPLE 13

The experimental procedures including the formulation of the resin composition and the evaluation tests were substantially the same as in Example 8 excepting replacement of 2.0 parts of sodium dodecylbenzene sulfonate with a combination of 2.0 parts of a 1:1 by weight mixture of sodium dodecyl sulfonate and potassium dodecyl sulfonate and 0.5 part of phosphoric acid ester of dodecyl polyoxyethylene (n,m=4–10). The results of the evaluation tests are summarized in Table 2.

EXAMPLE 14

The experimental procedures including the formulation of the resin composition and the evaluation tests were substantially the same as in Example 1 except that the PVA-based molding resin composition was prepared from 100 parts of a PVA having an average degree of polymerization of 1800 and a degree of saponification of 88.0% by moles, 20 parts of glycerin as a plasticizer and 2.0 parts of calcium dodecyl diphenyl ether disulfonate and the surface temperature of the mixing rollers was 210° C. instead of 215° C. The results of the evaluation tests are summarized in Table 2.

EXAMPLE 15

The experimental procedures including the formulation of the resin composition and the evaluation tests were substantially the same as in Example 14 excepting replacement of 2.0 parts of calcium dodecyl diphenyl ether disulfonate with 1.5 parts of phosphoric acid ester of dodecyl polyoxyethylene (n,m=4–10). The results of the evaluation tests are summarized in Table 2.

EXAMPLE 16

The experimental procedures including the formulation of the resin composition and the evaluation tests were substantially the same as in Example 14 excepting replacement of calcium dodecyl diphenyl ether disulfonate with the same amount of a 1:1 by weight mixture of sodium dodecyl sulfonate and potassium dodecyl sulfonate. The results of the evaluation tests are summarized in Table 2.

EXAMPLE 17

The experimental procedures including the formulation of the resin composition and the evaluation tests were substantially the same as in Example 14 excepting replacement of calcium dodecyl diphenyl ether disulfonate with the same amount of sodium dodecyl diphenyl ether disulfonate. The results of the evaluation tests are summarized in Table 2.

EXAMPLE 18

The experimental procedures including the formulation of the resin composition and the evaluation tests were substantially the same as in Example 14 excepting replacement of 2.0 parts of calcium dodecyl diphenyl ether disulfonate with a combination of 2.0 parts of sodium dodecylbenzene sulfonate and 0.5 part of phosphoric acid ester of dodecyl polyoxyethylene (n,m=4–10). The results of the evaluation tests are summarized in Table 2.

EXAMPLE 19

The experimental procedures including the formulation of the resin composition and the evaluation tests were substantially the same as in Example 14 excepting replacement of 2.0 parts of calcium dodecyl diphenyl ether disulfonate with a combination of 2.0 parts of calcium dodecylbenzene sulfonate and 0.5 part of phosphoric acid ester of dodecyl polyoxyethylene (n,m=4–10). The results of the evaluation tests are summarized in Table 2.

Comparative Example 6

The experimental procedures including the formulation of the resin composition and the evaluation tests were substantially the same as in Example 14 excepting replacement of 2.0 parts of calcium dodecyl diphenyl ether disulfonate with 3.0 parts of phosphoric acid. The results of the evaluation tests are summarized in Table 3.

Comparative Example 7

The experimental procedures including the formulation of the resin composition and the evaluation tests were substantially the same as in Example 14 excepting replacement of 2.0 parts of calcium dodecyl diphenyl ether disulfonate with 3.0 parts of diphenyl decyl phosphite. The results of the evaluation tests are summarized in Table 3.

Comparative Example 8

The experimental procedures including the formulation of the resin composition and the evaluation tests were substantially the same as in Example 14 excepting replacement of 2.0 parts of calcium dodecyl diphenyl ether disulfonate with 1.5 parts of calcium stearate. The results of the evaluation tests are summarized in Table 3.

Comparative Example 9

The experimental procedures including the formulation of the resin composition and the evaluation tests were substantially the same as in Example 14 excepting replacement of calcium dodecyl diphenyl ether disulfonate with the same amount of a polyethylene wax. The results of the evaluation tests are summarized in Table 3.

Comparative Example 10

The experimental procedures including the formulation of the resin composition and the evaluation tests were substantially the same as in Example 14 excepting replacement of 2.0 parts of calcium dodecyl diphenyl ether disulfonate with 1.5 parts of mercapto benzothiazole. The results of the evaluation tests are summarized in Table 3.

Comparative Example 11

The experimental procedures including the formulation of the resin composition and the evaluation tests were substantially the same as in Example 14 excepting replacement of calcium dodecyl diphenyl ether disulfonate with the same amount of synthetic hydrotalcite. The results of the evaluation tests are summarized in Table 3.

Comparative Example 12

The experimental procedures including the formulation of the resin composition and the evaluation tests were substantially the same as in Example 14 excepting replacement of 2.0 parts of calcium dodecyl diphenyl ether disulfonate with 1.5 parts of stearic acid. The results of the evaluation tests are summarized in Table 3.

Comparative Example 13

The experimental procedures including the formulation of the resin composition and the evaluation tests were substantially the same as in Example 14 excepting replacement of 2.0 parts of calcium dodecyl diphenyl ether disulfonate with 1.5 parts of a paraffin wax. The results of the evaluation tests are summarized in Table 3.

Comparative Example 14

The experimental procedures including the formulation of the resin composition and the evaluation tests were substantially the same as in Example 14 excepting replacement of 2.0 parts of calcium dodecyl diphenyl ether disulfonate with 1.5 parts of butylated hydroxytoluene. The results of the evaluation tests are summarized in Table 3.

Comparative Example 15

The experimental procedures including the formulation of the resin composition and the evaluation tests were substantially the same as in Example 14 excepting replacement of 2.0 parts of calcium dodecyl diphenyl ether disulfonate with 1.0 part of hydroquinone. The results of the evaluation tests are summarized in Table 1.

EXAMPLE 20

The experimental procedures including the formulation of the resin composition and the evaluation tests were substantially the same as in Example 1 except that the PVA-based molding resin composition was prepared from 100 parts of a PVA having an average degree of polymerization of 1000 and a degree of saponification of 88.0% by moles, 20 parts of glycerin as a plasticizer and 2.5 parts of sodium dodecylbenzene sulfonate and the surface temperature of the mixing rollers was 180° C. instead of 215° C. The results of the evaluation tests are summarized in Table 4.

EXAMPLE 21

The experimental procedures including the formulation of the resin composition and the evaluation tests were substantially the same as in Example 20 excepting replacement of 2.5 parts of sodium dodecylbenzene sulfonate with 2.0 parts of phosphoric acid ester of tridecyl polyoxyethylene (n,m=4–10). The results of the evaluation tests are summarized in Table 4.

EXAMPLE 22

The experimental procedures including the formulation of the resin composition and the evaluation tests were substantially the same as in Example 20 excepting replacement of 2.5 parts of sodium dodecylbenzene sulfonate with 2.0 parts of phosphoric acid ester of nonylphenyl polyoxyethylene (n,m=5–55). The results of the evaluation tests are summarized in Table 4.

EXAMPLE 23

The experimental procedures including the formulation of the resin composition and the evaluation tests were substantially the same as in Example 20 excepting replacement of sodium dodecylbenzene sulfonate with the same amount of a 1:1 by weight mixture of sodium dodecyl sulfonate and potassium dodecyl sulfonate. The results of the evaluation tests are summarized in Table 4.

EXAMPLE 24

The experimental procedures including the formulation of the resin composition and the evaluation tests were substantially the same as in Example 20 excepting replacement of sodium dodecylbenzene sulfonate with the same amount of calcium dodecylbenzene sulfonate. The results of the evaluation tests are summarized in Table 1.

EXAMPLE 25

The experimental procedures including the formulation of the resin composition and the evaluation tests were substantially the same as in Example 20 excepting replacement of 2.5 parts of sodium dodecylbenzene sulfonate with a combination of 2.0 parts of sodium dodecylbenzene sulfonate and 0.5 part of phosphoric acid ester of tridecyl polyoxyethylene (n,m=4–10). The results of the evaluation tests are summarized in Table 4.

EXAMPLE 26

The experimental procedures including the formulation of the resin composition and the evaluation tests were substantially the same as in Example 20 excepting replacement of 2.5 parts of sodium dodecylbenzene sulfonate with a combination of 2.0 parts of calcium dodecylbenzene sulfonate and 0.5 part of phosphoric acid ester of tridecyl polyoxyethylene (n,m=4–10). The results of the evaluation tests are summarized in Table 4.

Comparative Example 16

The experimental procedures including the formulation of the resin composition and the evaluation tests were substantially the same as in Example 20 excepting omission of sodium dodecylbenzene sulfonate in the formulation of the resin composition. The results of the evaluation tests are summarized in Table 4.

Comparative Example 17

The experimental procedures including the formulation of the resin composition and the evaluation tests were substantially the same as in Example 20 excepting replacement of sodium dodecylbenzene sulfonate with the same amount of sodium dioctyl sulfosuccinate. The results of the evaluation tests are summarized in Table 4.

Comparative Example 1.8

The experimental procedures including the formulation of the resin composition and the evaluation tests were substantially the,same as in Example 20 excepting replacement of sodium dodecylbenzene sulfonate with the same amount of dodecylbenzene sulfonic acid. The results of the evaluation tests are summarized in Table 4.

Comparative Example 19

The experimental procedures including the formulation of the resin composition and the evaluation tests were substantially the same as in Example 20 excepting replacement of sodium dodecylbenzene sulfonate with the same amount of di- 2-ethylhexyl phosphate. The results of the evaluation tests are summarized in Table 4.

Comparative Example 20

The experimental procedures including the formulation of the resin composition and the evaluation tests were substantially the same as in Example 20 excepting replacement of 2.5 parts of sodium dodecylbenzene sulfonate with 2.0 part of calcium stearate. The results of the evaluation tests are summarized in Table 4.

EXAMPLE 27

The experimental procedures including the formulation of the resin composition and the evaluation tests were substantially the same as in Example 1 except that the PVA-based molding resin composition was prepared from 95 parts of a first PVA having an average degree of polymerization of 1040 and a degree of saponification of 88.0% by moles, 5 parts of a second PVA having an average degree of polymerization of 600 and a degree of saponification of 88.0% by moles, 20 parts of glycerin as a plasticizer and 5.0 parts of calcium dodecylbenzene sulfonate and the surface temperature of the mixing rollers was 190° C. instead of 215° C. The results of the evaluation tests are summarized in Table 4.

Further, the PVA-based molding resin composition prepared above was subjected to molding tests by extrusion molding and injection molding to give the results shown in Table 5. The conditions in these molding tests were as shown below.

Extrusion molding:
double-screw extruder machine having screws of L=1280 mm and D=40 mm (L/D=32); screw revolution 70 rpm; temperature of cylinder at the compression zone 205° C.; temperature of T-die 200° C.

Injection molding:
injection molding machine Model J 220E (manufactured by Nippon Steel Corp.); milling temperature 195° C.; temperature at the injection nozzle 200° C.; temperature of metal mold 50° C.; injection pressure 1250 kg/cm 2; molding cycle 20 seconds Recording was made of the results of these molding tests for the items of:

coloration of molded articles;

surface smoothness of molded articles; and workability for continuous molding, in each of the extrusion molding and injection molding tests. Table 5 below shows the results in five ratings giving point 5 for the best condition and point 1 for the worst conditions.

EXAMPLE 28

The experimental procedures including the formulation of the resin composition and the evaluation and molding tests were substantially the same as in Example 27 excepting replacement of 5.0 parts of calcium dodecylbenzene sulfonate with 2.5 parts of phosphoric acid ester of nonylphenyl polyoxyethylene (n,m=5–55). The results of the evaluation tests and the molding tests are summarized in Tables 4 and 5, respectively.

EXAMPLE 29

The experimental procedures including the formulation of the resin composition and the evaluation and molding tests were substantially the same as in Example 27 excepting replacement of 5.0 parts of calcium dodecylbenzene sulfonate with a combination of 2.0 parts of sodium dodecylbenzene sulfonate and 0.5 part of phosphoric acid ester of tridecyl polyoxyethylene (n,m=4–10). The results of the evaluation tests and the molding tests are summarized in Tables 4 and 5, respectively.

Comparative Example 21

The experimental procedures including the formulation of the resin composition and the evaluation and molding tests were substantially the same as in Example 27 excepting replacement of 5.0 parts of calcium dodecylbenzene sulfonate with 2.5 parts of sodium dioctyl sulfosuccinate. The results of the evaluation tests and the molding tests are summarized in Tables 4 and 5, respectively.

Comparative Example 22

The experimental procedures including the formulation of the resin composition and the evaluation and molding tests were substantially the same as in Example 27 excepting replacement of 5.0 parts of calcium dodecylbenzene sulfonate with 2.0 parts of calcium stearate. The results of the evaluation tests and the molding tests are summarized in Tables 4 and 5, respectively.

TABLE 1

|  | Coloration after 10 minutes rolling | Releasability of sheet | Incipient sticking, minutes | Surface smoothness of sheet | Plate-out in rolling |
|---|---|---|---|---|---|
| Example |  |  |  |  |  |
| 1 | 5 | 4 | 14 | 4 | 4 |
| 2 | 5 | 5 | 16 | 5 | 4 |
| 3 | 5 | 4 | 16 | 4 | 4 |
| 4 | 5 | 5 | 24 | 5 | 5 |
| 5 | 5 | 5 | 21 | 5 | 5 |
| 6 | 5 | 5 | 18 | 5 | 5 |
| 7 | 5 | 5 | 20 | 5 | 5 |
| Comparative Example |  |  |  |  |  |
| 1 | — | 1 | 0.5 | — | — |
| 2 | — | 1 | 2 | — | — |
| 3 | — | 2 | 3 | — | — |
| 4 | — | 1 | 0.5 | — | — |
| 5 | — | 2 | 6 | 2 | 3 |

TABLE 2

|  | Coloration after 10 minutes rolling | Releasability of sheet | Incipient sticking, minutes | Surface smoothness of sheet | Plate-out in rolling |
|---|---|---|---|---|---|
| Example |  |  |  |  |  |
| 8 | 5 | 4 | 18 | 4 | 5 |
| 9 | 5 | 5 | 24 | 5 | 5 |
| 10 | 5 | 5 | 15 | 5 | 4 |
| 11 | 5 | 5 | 20 | 5 | 5 |
| 12 | 5 | 4 | 17 | 4 | 4 |
| 13 | 5 | 5 | 22 | 5 | 5 |
| 14 | 5 | 4 | 16 | 4 | 4 |
| 15 | 5 | 5 | 22 | 5 | 5 |
| 16 | 5 | 5 | 14 | 4 | 4 |
| 17 | 5 | 4 | 17 | 4 | 4 |
| 18 | 5 | 5 | 23 | 5 | 5 |
| 19 | 5 | 5 | 21 | 5 | 5 |

TABLE 3

|  | Coloration after 10 minutes rolling | Releasability of sheet | Incipient sticking, minutes | Surface smoothness of sheet | Plate-out in rolling |
|---|---|---|---|---|---|
| Comparative Example |  |  |  |  |  |
| 6 | — | 1 | 4 | — | 1 |
| 7 | — | 2 | 7 | 2 | 2 |
| 8 | — | 2 | 7 | 2 | 2 |
| 9 | — | 2 | 5 | 1 | 1 |
| 10 | — | 2 | 3 | — | 2 |
| 11 | — | 1 | 3 | — | 1 |
| 12 | — | 2 | 2 | — | 2 |
| 13 | — | 2 | 2 | — | 2 |
| 14 | — | 2 | 6 | 2 | 1 |
| 15 | — | 2 | 5 | 1 | 2 |

TABLE 4

|  | Coloration after 10 minutes rolling | Releasability of sheet | Incipient sticking, minutes | Surface smoothness of sheet | Plate-out in rolling |
|---|---|---|---|---|---|
| Example |  |  |  |  |  |
| 20 | 4 | 4 | 26 | 4 | 4 |
| 21 | 5 | 5 | 33 | 5 | 5 |
| 22 | 5 | 5 | 30 | 5 | 5 |
| 23 | 4 | 5 | 28 | 5 | 5 |
| 24 | 4 | 4 | 25 | 5 | 4 |
| 25 | 5 | 5 | 36 | 5 | 5 |
| 26 | 5 | 5 | 31 | 5 | 5 |
| 27 | 5 | 5 | 22 | 5 | 5 |
| 28 | 5 | 5 | 28 | 5 | 5 |
| 29 | 5 | 5 | 30 | 5 | 5 |
| Comparative Example |  |  |  |  |  |
| 16 | — | 1 | 1 | — | — |
| 17 | — | 2 | 7 | 2 | 3 |
| 18 | — | 1 | 2 | — | — |
| 19 | — | 2 | 3 | — | — |
| 20 | — | 2 | 6 | 2 | 3 |
| 21 | — | 2 | 5 | 2 | 2 |
| 22 | — | 2 | 2 | — | — |

TABLE 5

| | Extrusion molding | | | Injection molding | | |
|---|---|---|---|---|---|---|
| | Coloration of molded article | Surface smoothness of article | Continuous moldability | Coloration of molded article | Surface smoothness of article | Continuous moldability |
| Example | | | | | | |
| 27 | 5 | 4 | 5 | 5 | 4 | 5 |
| 28 | 5 | 5 | 5 | 5 | 5 | 5 |
| 29 | 5 | 5 | 5 | 5 | 5 | 5 |
| Comparative Example | | | | | | |
| 21 | 1 | 1 | 1 | 1 | 2 | 1 |
| 22 | 1 | 1 | 1 | 1 | 2 | 1 |

What is claimed is:

1. A polyvinyl alcohol molding resin composition which comprises, as a uniform blend:

(a) 100 parts by weight of a polyvinyl alcohol resin; and
   (b) from 0.01 to 30 parts by weight of an additive ingredient selected from the group consisting of:
      (b1) a metal salt of an organic sulfonic acid represented by the general formula $(R^1SO_3)_xM$, in which $R^1$ is an alkyl group, alkoxy group, diaryl ether group or alkaryl group having from 10 to 24 carbon atoms, M is an atom of an alkali metal or an alkaline earth metal and the subscript x is 1, when M is an atom of an alkali metal, or 2, when M is an atom of an alkaline earth metal;
      (b2) a polyoxyethylene phosphoric acid ester represented by the general formula $R^2O(CH_2CH_2O)_nPO[O(CH_2CH_2O)_mR^3]_{2-y}(OH)_y$, in which $R^2$ and $R^3$ are each, independently from the other, an alkyl or alkaryl group having 4 to 24 carbon atoms, the subscript y is 1 or 2 and the subscripts n and m are each, independently from the other, a positive integer not exceeding 100;
   and a combination of (b1) and (b2).

2. The polyvinyl alcohol molding resin composition as claimed in claim 1 in which the metal salt of organic sulfonic acid is sodium or calcium dodecylbenzene sulfonate.

3. The polyvinyl alcohol molding resin composition as claimed in claim 1 in which the polyoxyethylene phosphoric acid ester is a compound of the general formula of which the polyoxyethylene group is a tridecyl polyoxyethylene group and the subscripts n and m are each an integer of 4 to 10 or is a compound of the general formula of which the polyoxyethylene group is a nonylphenyl polyoxyethylene group and the subscripts n and m are each an integer of 5 to 55.

4. The polyvinyl alcohol molding resin composition as claimed in claim 1 in which the additive ingredient is a combination of (b1) the metal salt of an organic sulfonic acid and (b2) the polyoxyethylene phosphoric acid ester in a weight ratio in the range from 90:10 to 30:70.

5. The polyvinyl alcohol molding resin composition as claimed in claim 1 in which the amount of the additive ingredient as the component (b) is in the range from 0.1 to 8 parts by weight per 100 parts by weight of the polyvinyl alcohol resin as the component (a).

6. The polyvinyl alcohol-based molding resin composition as claimed in claim 1 in which the polyvinyl alcohol resin as the component (a) has an average degree of polymerization in the range from 100 to 3000 and a degree of saponification of at least 50% by moles.

* * * * *